(12) United States Patent
Wu

(10) Patent No.: US 9,517,512 B2
(45) Date of Patent: Dec. 13, 2016

(54) ULTRASONIC POSITIONING DEVICE FOR FIVE-AXIS MACHINE

(71) Applicant: CHUAN LIANG INDUSTRIAL CO., LTD., Taichung (TW)

(72) Inventor: Jung-Chun Wu, Taichung (TW)

(73) Assignee: CHUAN LIANG INDUSTRIAL CO., LTD., Taichung (TW)

( * ) Notice: Subject to any disclaimer, the term of this patent is extended or adjusted under 35 U.S.C. 154(b) by 302 days.

(21) Appl. No.: 14/497,582

(22) Filed: Sep. 26, 2014

(65) Prior Publication Data

US 2016/0091307 A1   Mar. 31, 2016

(51) Int. Cl.
| | |
|---|---|
| *G01N 29/00* | (2006.01) |
| *B23B 37/00* | (2006.01) |
| *B23Q 1/54* | (2006.01) |
| *B06B 3/00* | (2006.01) |

(52) U.S. Cl.
CPC .............. *B23B 37/00* (2013.01); *B06B 3/00* (2013.01); *B23Q 1/5443* (2013.01); *B23B 2270/10* (2013.01); *B23C 2270/10* (2013.01)

(58) Field of Classification Search
CPC ......... G01B 17/00; B23Q 1/64; B23Q 1/5443; B23B 37/00; B23B 2270/10; B06B 3/00; B23C 2270/10
See application file for complete search history.

(56) References Cited

U.S. PATENT DOCUMENTS

| | | | | |
|---|---|---|---|---|
| 3,823,644 A | * | 7/1974 | Mello | B23C 1/12 408/236 |
| 3,828,649 A | * | 8/1974 | Lecailtel | B23Q 11/0042 409/137 |
| 4,262,892 A | * | 4/1981 | Wu | B25B 1/125 269/181 |
| 4,945,898 A | * | 8/1990 | Pell | A61B 17/225 310/317 |
| 5,033,456 A | * | 7/1991 | Pell | A61B 17/2251 600/439 |
| 5,065,761 A | * | 11/1991 | Pell | A61B 17/2258 600/439 |
| 5,134,988 A | * | 8/1992 | Pell | A61B 17/2251 310/334 |
| 5,294,220 A | * | 3/1994 | Ohmstede | B23Q 11/0042 408/234 |
| 5,844,140 A | * | 12/1998 | Seale | A61B 8/08 310/90.5 |
| 2002/0025757 A1 | * | 2/2002 | Gross | B23Q 7/047 451/5 |

(Continued)

FOREIGN PATENT DOCUMENTS

WO   WO 0065338 A1 * 11/2000 ........... A61B 8/4461

*Primary Examiner* — Harshad R Patel
*Assistant Examiner* — Samir M Shah
(74) *Attorney, Agent, or Firm* — Jackson IPG PLLC; Demian K. Jackson

(57) ABSTRACT

An ultrasonic positioning device for a five-axis machine includes an ultrasonic device and a positioning plate. The ultrasonic device is adapted to fix a material and generates ultrasonic vibrations to the material. The positioning plate is adapted to fix the ultrasonic device and pivotally connected the five-axis machine for the material to be controlled by the five-axis movement on the five-axis machine. By cooperating with the ultrasonic vibrations, a processing portion of the five-axis machine can process the material.

9 Claims, 16 Drawing Sheets

(56) References Cited

U.S. PATENT DOCUMENTS

| | | | | |
|---|---|---|---|---|
| 2003/0182782 | A1* | 10/2003 | Hessbruggen | B23Q 1/012 29/27 C |
| 2004/0065415 | A1* | 4/2004 | Sato | B23K 20/10 156/580.1 |
| 2006/0048364 | A1* | 3/2006 | Zhang | B23Q 17/0966 29/407.08 |
| 2008/0114485 | A1* | 5/2008 | Katoh | G05B 19/404 700/193 |
| 2009/0140684 | A1* | 6/2009 | Otsuki | G05B 19/404 318/572 |
| 2009/0157218 | A1* | 6/2009 | Otsuki | G05B 19/404 700/188 |
| 2011/0044778 | A1* | 2/2011 | Yamada | G05B 19/416 409/80 |
| 2011/0200406 | A1* | 8/2011 | Lang | B23Q 7/047 483/31 |
| 2011/0288677 | A1* | 11/2011 | Meidar | B25J 9/047 700/193 |
| 2014/0093322 | A1* | 4/2014 | Bleicher | B30B 15/304 409/131 |

* cited by examiner

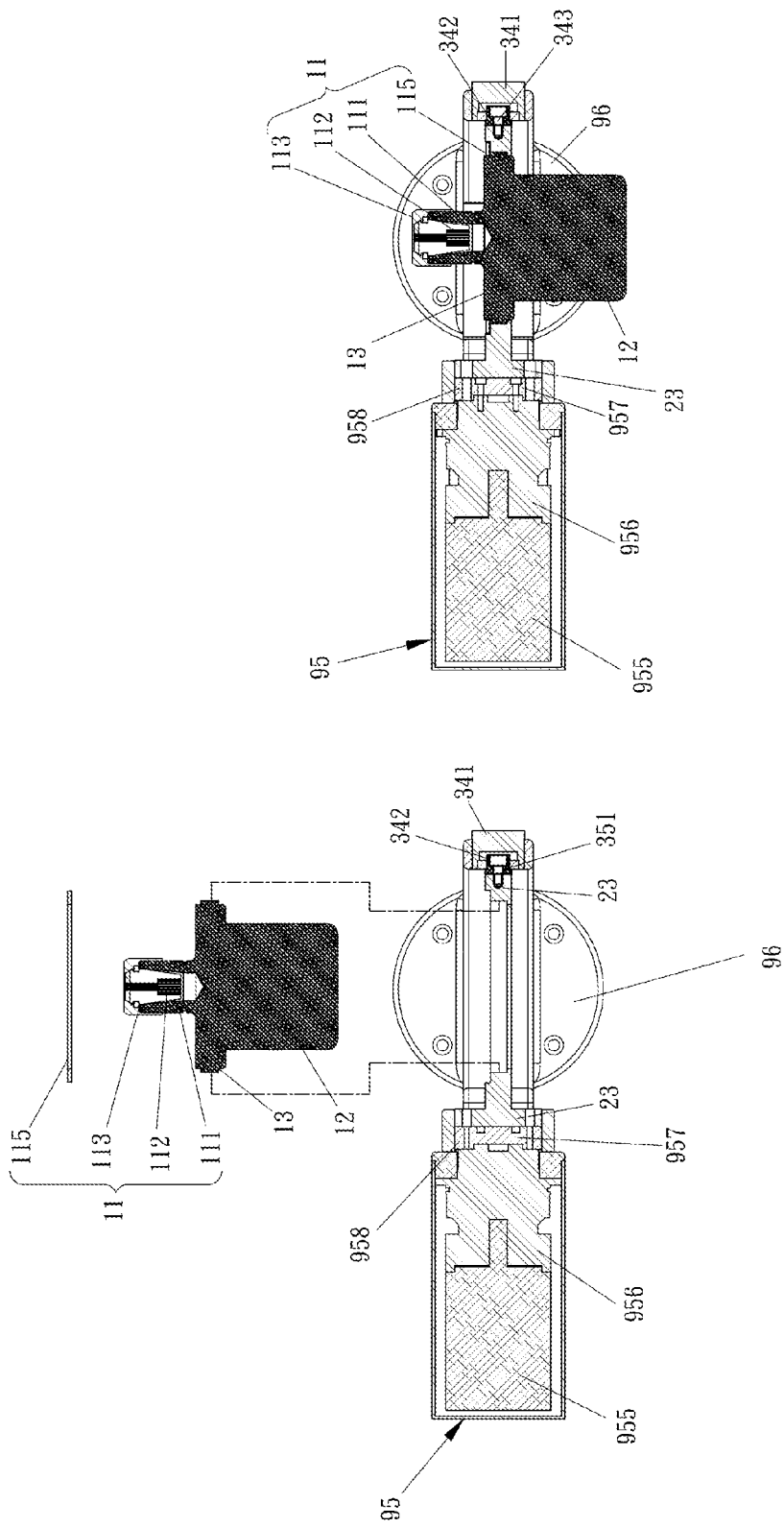

ULTRASONIC POSITIONING DEVICE FOR FIVE-AXIS MACHINE

BACKGROUND OF THE INVENTION

1. Field of the Invention

The present invention relates to an ultrasonic positioning device for a five-axis machine, and more particularly, to an ultrasonic positioning device which is beneficial for processing and can be used widely.

2. Description of the Prior Art

A conventional five-axis process comprises a base, a vertical support rod unit, an upper support rod unit, a processing platform, an axis seat, a linear slide X axis, a linear slide Y axis, a linear slide Z axis, a W movement axis, a U movement axis, and a processing machine. The workpiece is placed on the processing platform, with the linear slide X axis, the linear slide Y axis, the linear slide Z axis, the W movement axis, and the U movement axis to move and control the position of the processing platform and the turning angle to carry out a five-axis movement for processing. So far, there is no ultrasonic positioning device disposed on a five-axis machine on the market. Accordingly, the inventor of the present invention has devoted himself based on his many years of practical experiences to solve these problems.

SUMMARY OF THE INVENTION

The primary object of the present invention is to provide an ultrasonic positioning device for a five-axis machine able to carry out a five-axis movement. The ultrasonic positioning device is beneficial for processing and can be used widely.

In order to achieve the aforesaid object, the ultrasonic positioning device for a five-axis machine comprises an ultrasonic device and a positioning plate. The ultrasonic device has a working end portion, a vibration end portion, and a first connecting portion. The working end portion is adapted to fix a material. The vibration end portion is connected to the working end portion and configured to generate ultrasonic vibrations for the material. The first connecting portion is connected between the working end portion and the vibration end portion, and adapted for an external connection of the ultrasonic device. The positioning plate comprises a positioning portion, a second connecting portion, and a pair of pivot portions. The positioning portion is adapted to accommodate and position the vibration end portion. The second connecting portion corresponds to the first connecting portion, and is disposed on the positioning plate for the positioning plate to be connected with the ultrasonic device. The pair of pivot portions is adapted for the positioning plate to be pivotally connected to the five-axis machine, such that the working end portion is brought to carry out a five-axis movement on the five-axis machine and to process the material by cooperating with the ultrasonic vibrations.

Preferably, the working end portion comprises a base, a sleeve, a screw nut, and a material fixture. The base is connected to the first connecting portion. The sleeve is disposed in the base and changeable between a release position and a grip position. The screw nut is adapted to lock the base and able to release and clip the sleeve so that the sleeve is changeable between the release position and the grip position. The material fixture is disposed in the sleeve and adapted to fix the material. When the sleeve is changed between the release position and the grip position, the material fixture is able to disengage from and engage with the sleeve, respectively.

Preferably, the vibration end portion is an ultrasonic vibration configuration.

Preferably, the five-axis machine comprises a first-axis movement device, a second-axis movement device, a third-axis movement device, a fourth-axis movement device, a fifth-axis movement device, a working portion, and a processing portion. The first-axis movement device is disposed on the five-axis machine and movable along a first movement direction. The second-axis movement device is disposed on the first-axis movement device and movable along a second movement direction. The processing portion is disposed on the third-axis movement device. The third-axis movement device is disposed on the second-axis movement device for bringing the processing portion to move along a third movement direction. The fifth-axis movement device is disposed on the fourth-axis movement device. The fourth-axis movement device is disposed on the five-axis machine for bringing the fifth-axis movement device to move along a fourth movement direction. The pair of pivot portions is adapted for the positioning plate to be pivotally connected to the fifth-axis movement device. The working portion is disposed on the fourth-axis movement device. The fifth-axis movement device is adapted to bring the positioning plate to move along a fifth movement direction. The first-axis movement device, the second-axis movement device, the third-axis movement device, the fourth-axis movement device, and the fifth-axis movement device of the five-axis machine are controlled to carry out a five-axis movement by cooperating with processing conditions so as to control the processing portion to carry out processing operations relative to the working end portion of the ultrasonic device and to process the material by cooperating with the ultrasonic vibrations.

Preferably, the fifth-axis movement device comprises a motor, an elastic holding seat, a positioning unit, and an induction ring. The motor is locked to the working portion by screws for bringing the positioning plate to turn along the fifth movement direction. The elastic holding seat is disposed between the motor and the positioning plate. The elastic holding seat comprises a plurality of screws, a spring fixing seat, a spring, and a holding post. The positioning unit is disposed between the elastic holding seat and the positioning plate. The positioning unit comprises a positioning seat, a positioning post, and screws for locking the positioning seat to the motor. The positioning seat is locked to the elastic holding seat by the screws of the elastic holing seat. The holding post of the elastic holding seat is inserted through the center of the positioning seat. The positioning unit is rotated along with the motor. The front end of the positioning seat is connected to one of the pivot portions of the positioning plate to bring the positioning plate and the ultrasonic device to turn accordingly when the positioning unit is rotated along with the motor. The induction ring is fitted on the positioning seat and located between the positioning unit and the working portion. The working portion is a hollow frame configured to receive the positioning plate and has two pivot holes corresponding to the two pivot portions of the positioning plate.

Preferably, the ultrasonic positioning device for a five-axis machine further comprises a cylinder, a bearing unit, and a holding ring. The cylinder is first locked on a cylinder fixing board by screws, and then connected to the working portion by screws. The bearing unit is disposed between the cylinder and the positioning plate. The bearing unit comprises a plurality of screws, a thimble, a plurality of bearings, a bearing fixing plate, and a bearing seat. The thimble is located at the front end of the bearing seat. The cylinder is able to control engagement and disengagement of the front end of the thimble and the other of the pivot portions of the positioning plate. The holding ring is disposed in the pivot holes of the working portion to receive the bearing unit and located between the bearing unit and the positioning plate.

Preferably, the working end portion further comprises a press plate for pressing the vibration end portion to be fixed to the positioning portion.

Preferably, the fifth-axis movement device comprises a motor, a deceleration device, a positioning unit, and an induction ring. The deceleration device is locked to the front end of the motor by screws and locked to the working portion by screws. The deceleration device is adapted to decelerate the power driven by the motor. The positioning unit is disposed between the deceleration device and the positioning plate. The positioning unit comprises a positioning seat and screws for locking the positioning seat to the deceleration device. The positioning unit and the deceleration device are rotated along with the motor. The front end of the positioning seat is connected with one of the pivot portions of the positioning plate. When the positioning unit is rotated along with the motor, the positioning plate and the ultrasonic device are brought to turn accordingly. The induction ring is located between the positioning unit and the working portion. The working portion is a unilateral frame and has two pivot holes corresponding to the two pivot portions of the positioning plate. The induction ring is disposed on one of the pivot holes.

Preferably, the ultrasonic positioning device for a five-axis machine further comprises a bearing unit and a support post. The bearing unit comprises a bearing seat, a bearing, and a plurality of screws. The bearing seat is inserted in the other of the pivot holes of the working portion. The bearing is inserted in the bearing seat. The bearing seat is locked to the outside of the other of the pivot holes of the working portion by the screws. The support post is located in the pivot hole of the working portion, and coupled to the pivot portion at one end of the positioning plate by screws, and inserted in the bearing of the bearing unit to be turned. The pivot portion at the other end of the positioning plate is connected with the front end of the positioning seat of the positioning unit. When the positioning unit is rotated along with the motor, the positioning plate and the ultrasonic device are brought to turn accordingly.

BRIEF DESCRIPTION OF THE DRAWINGS

FIG. 12 is an exploded sectional view of FIG. 11;

FIG. 13 is an assembled sectional view of FIG. 11;

DETAILED DESCRIPTION OF THE PREFERRED EMBODIMENTS

Figure 1:
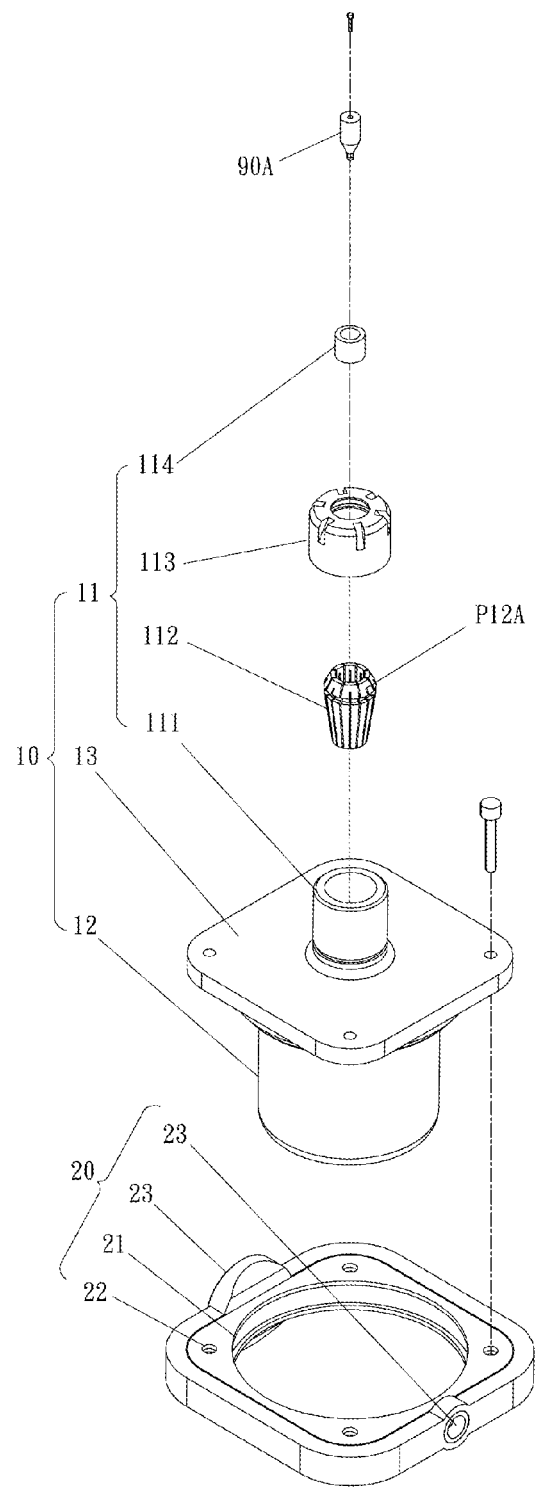
FIG. 1 is an exploded view according to a first embodiment of the present invention.
Figure 2:
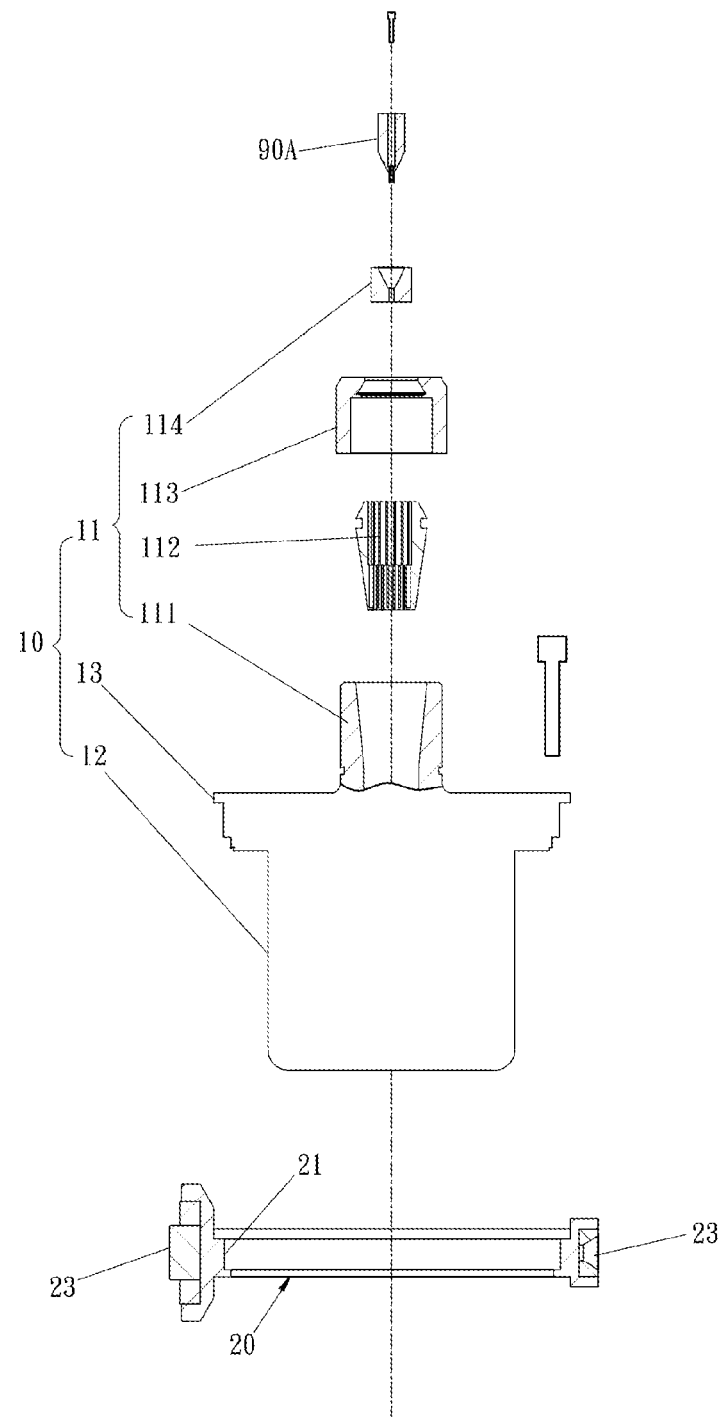
FIG. 2 is a partial sectional view of FIG. 1.
Figure 3:
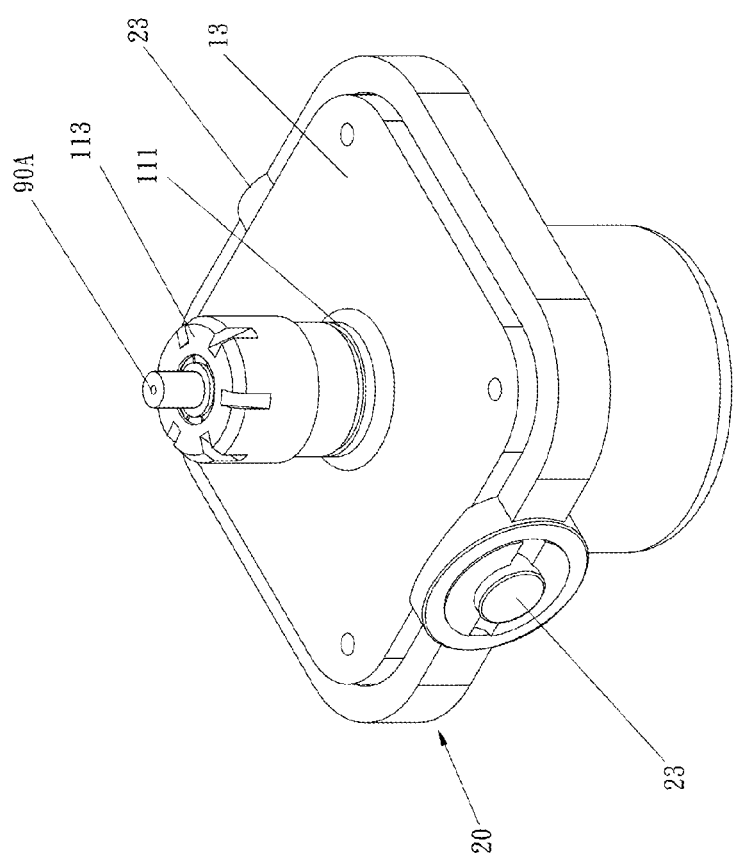
FIG. 3 is a perspective view of FIG. 1.
Figure 4:
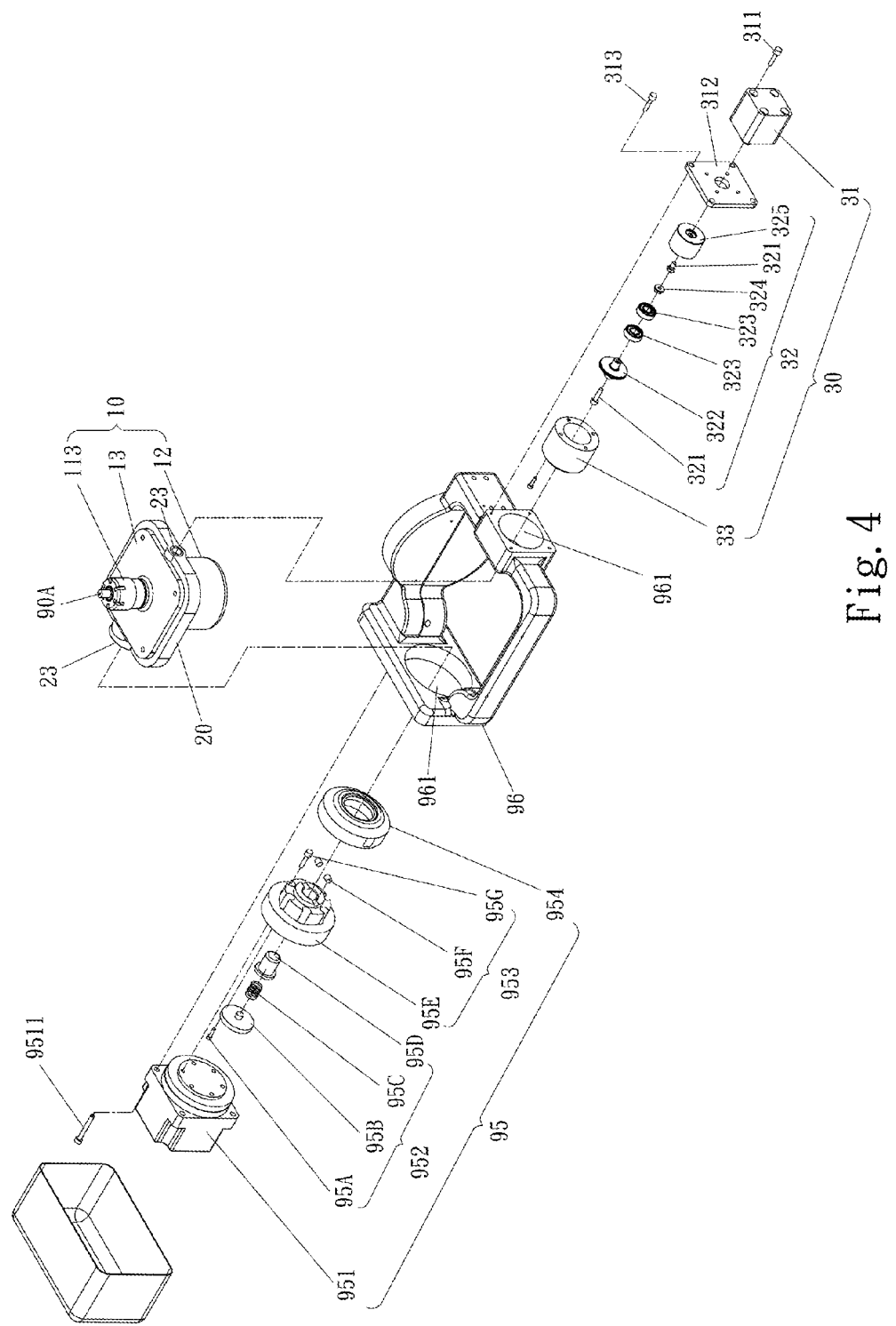
FIG. 4 is an exploded view of an embodiment of FIG. 1.
Figure 5:
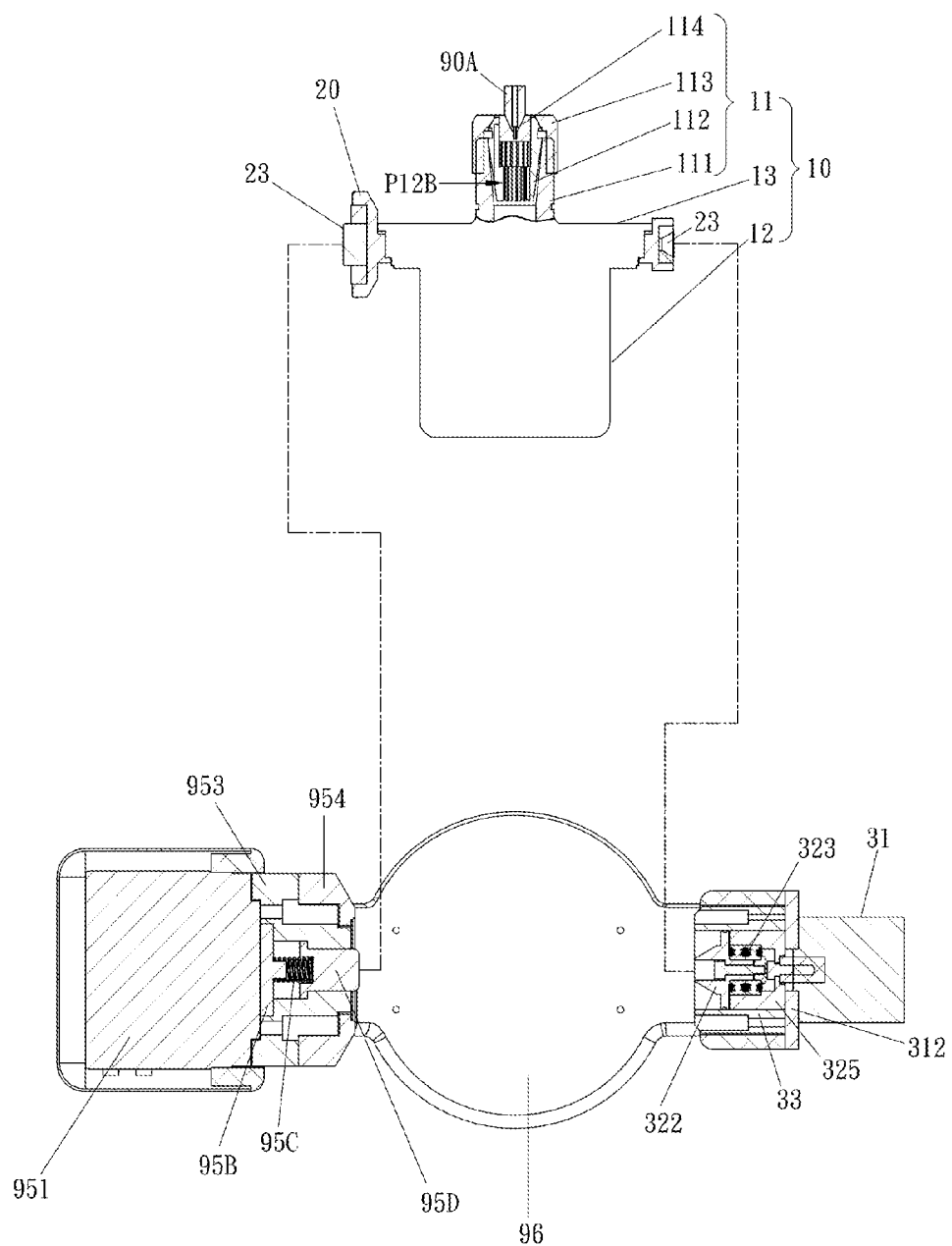
FIG. 5 is a partial assembled sectional view of FIG. 4.
Figure 5A:
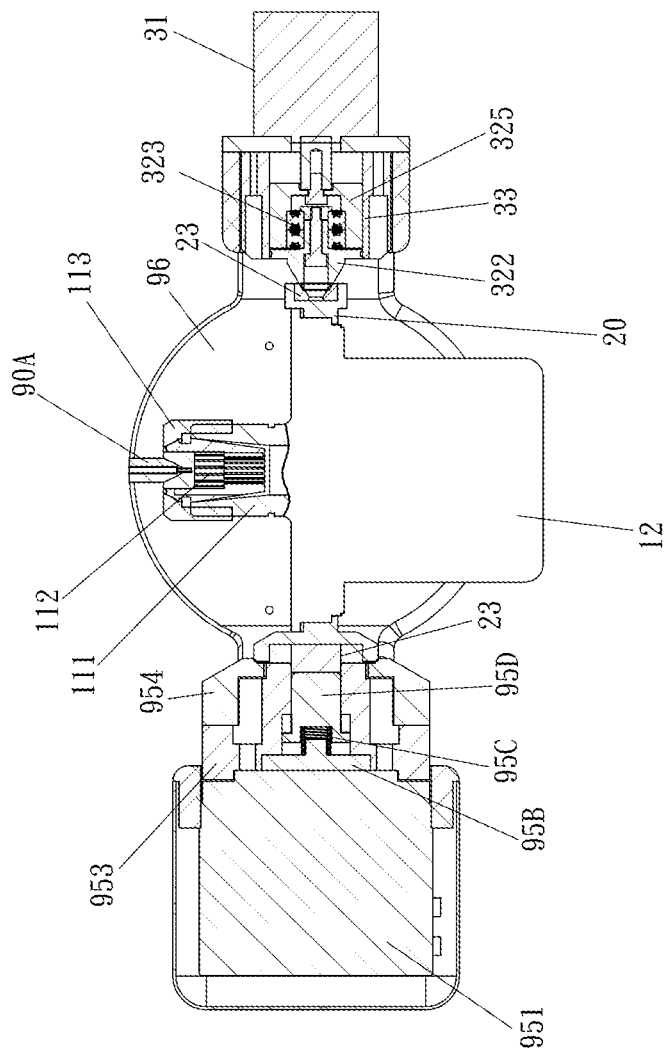
FIG. 5A is an assembled sectional view of FIG. 5 (the thimble is extended and engaged with the pivot portion)
Figure 5B:
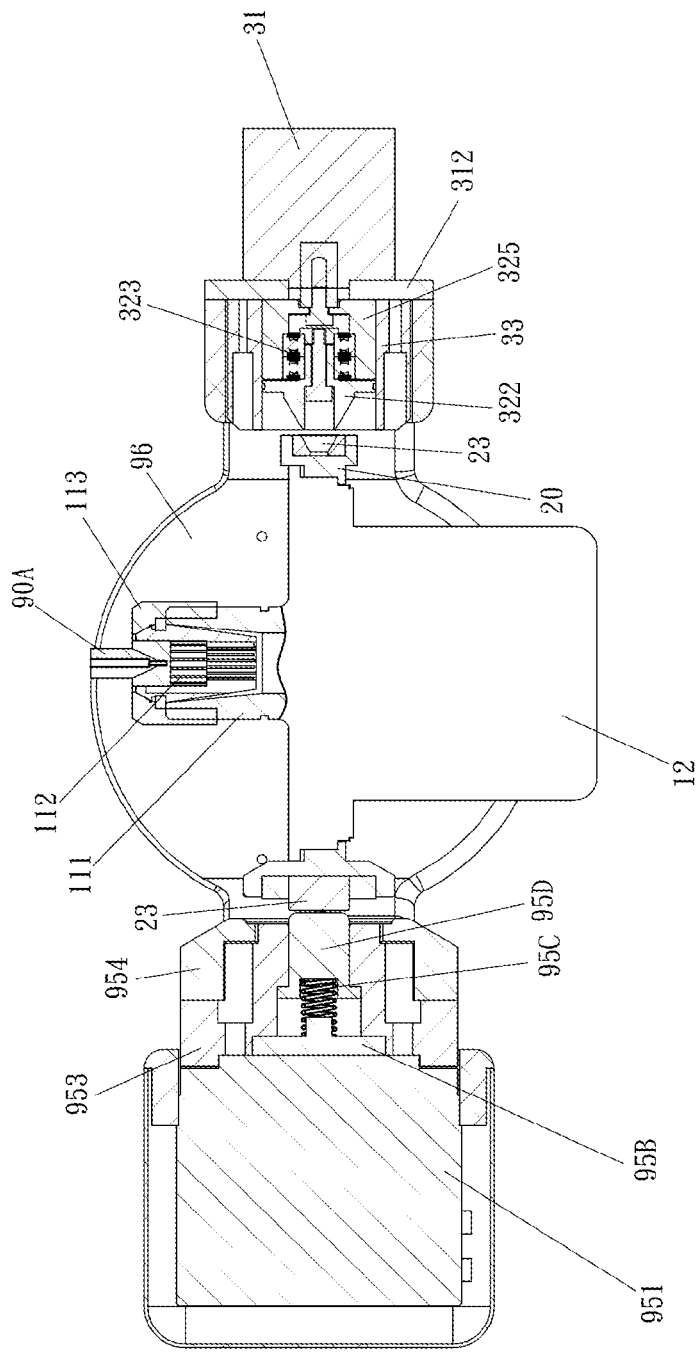
FIG. 5B is an assembled sectional view of FIG. 5 (the thimble is retracted and disengaged from the pivot portion)
Figure 6A:
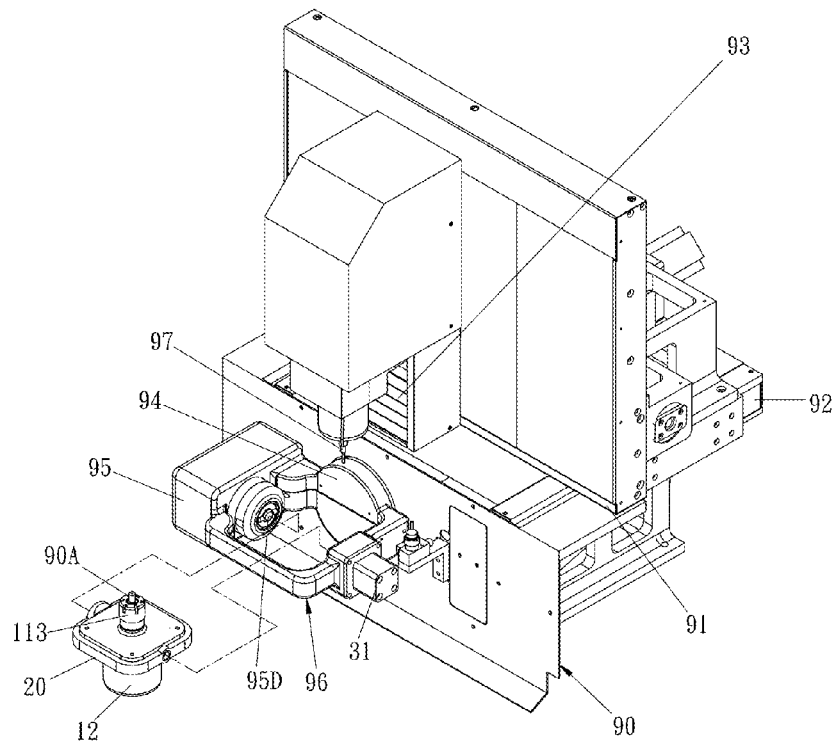
FIG. 6A and FIG. 6B are schematic views of the present invention applied to the five-axis machine seen at different angles.
Figure 6B:
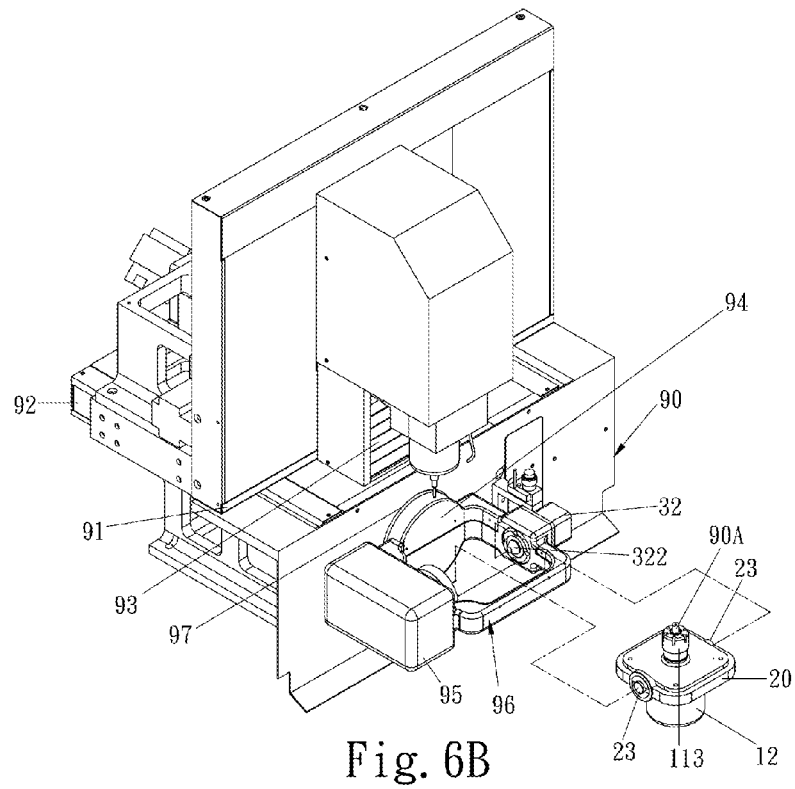

Embodiments of the present invention will now be described, by way of example only, with reference to the accompanying drawings.

As shown in FIG. 1 to FIG. 10, the present invention discloses an ultrasonic positioning device disposed on a five-axis machine, and comprises an ultrasonic device 10 and a positioning plate 20.

The ultrasonic device 10 has a working end portion 11, a vibration end portion 12, and a first connecting portion 13. The working end portion 11 is adapted to fix a material 90A. The vibration end portion 12 is connected to the working end portion 11 and configured to generate ultrasonic vibrations for the material 90A. The first connecting portion 13 is connected between the working end portion 11 and the vibration end portion 12 and adapted for an external connection of the ultrasonic device 10.

The positioning plate 20 comprises a positioning portion 21, a second connecting portion 22, and a pair of pivot portions 23. The positioning portion 21 is adapted to accommodate the vibration end portion 12. The second connecting portion 22 corresponds to the first connecting portion 13, and is disposed on the positioning plate 20 for the positioning plate 20 to be connected with the ultrasonic device 10. The pair of pivot portions 23 is adapted for the positioning plate 20 to be pivotally connected to the five-axis machine 90, such that the working end portion 11 can be brought to carry out a five-axis movement on the five-axis machine 90 and to process the material 90A by cooperating with the ultrasonic vibrations.

The working end portion 11 comprises a base 111, a sleeve 112, a screw nut 113, and a material fixture 114. The base 111 is connected to the first connecting portion 13. The sleeve 112 is disposed in the base 111 and changeable between a release position P12A (referring to FIG. 1) and a grip position P12B (referring to FIG. 5). The screw nut 113 is adapted to lock the base 111 and able to release and clip the sleeve 112, so that the sleeve 112 can be changed between the release position P12A and the grip position P12B. The material fixture 114 is disposed in the sleeve 112 and adapted to fix the material 90A. When the sleeve 112 is changed between the release position P12A and the grip position P12B, the material fixture 114 can disengage from and engage with the sleeve 112, respectively.

The vibration end portion 12 can be an ultrasonic vibration configuration.

Referring to FIG. 6A, FIG. 6B, FIG. 7 to FIG. 9, the five-axis machine 90 comprises a first-axis movement device 91, a second-axis movement device 92, a third-axis movement device 93, a fourth-axis movement device 94, a fifth-axis movement device 95, a working portion 96, and a processing portion 97. The first-axis movement device 91 is disposed on the five-axis machine 90 (referring to FIG. 7 and FIG. 8) and movable along a first movement direction X. The second-axis movement device 92 is disposed on the first-axis movement device 91 and movable along a second movement direction Y. The processing portion 97 is disposed on the third-axis movement device 93. The third-axis movement device 93 is disposed on the second-axis movement device 92 for bringing the processing portion 97 to move along a third movement direction Z. The fifth-axis movement device 95 is disposed on the fourth-axis movement device 94. The fourth-axis movement device 94 is disposed on the five-axis machine 90 for bringing the fifth-axis movement device 95 to move along a fourth movement direction U. The pair of pivot portions 23 is adapted for the positioning plate 20 to be pivotally connected to the fifth-axis movement device 95. The working portion 96 is disposed on the fourth-axis movement device 94. The fifth-axis movement device 95 is adapted to bring the positioning plate 20 to move along a fifth movement direction W. The first-axis movement device 91, the second-axis movement device 92, the third-axis movement device 93, the fourth-axis movement device 94, and the fifth-axis movement device 95 of the five-axis machine 90 are controlled to carry out a five-axis movement by cooperating with processing conditions so as to control the processing portion 97 to carry out processing operations relative to the working end portion 11 of the ultrasonic device 10 and to process the material 90A by cooperating with the ultrasonic vibrations.

FIG. 4, FIG. 5, FIG. 5A and FIG. 5B show a first embodiment (a moveable type) of the present invention. The fifth-axis movement device 95 comprises a motor 951, an elastic holding seat 952, a positioning unit 953, and an induction ring 954. The motor 951 is locked to the working portion 96 by screws 9511 for bringing the positioning plate 20 to turn along the fifth movement direction W. The elastic holding seat 952 is disposed between the motor 951 and the positioning plate 20, and comprises a plurality of screws 95A, a spring fixing seat 95B, a spring 95C, and a holding post 95D. The positioning unit 953 is disposed between the elastic holding seat 952 and the positioning plate 20. The positioning unit 953 comprises a positioning seat 95E, a positioning post 95F, and screws 95G. The positioning seat 95E is locked to the elastic holding seat 952 through screws 95A. The holding post 95D of the elastic holding seat 952 is inserted through the center of the positioning seat 95E. The positioning seat 95E is locked to the motor 951 by the screws 95G. The positioning unit 953 can be rotated along with the motor 951. The front end of the positioning seat 95E is connected to one of the pivot portions 23 of the positioning plate 20. When the positioning unit 953 is rotated along with the motor 951, the positioning plate 20 and the ultrasonic device 10 are brought to turn accordingly. The induction ring 954 is fitted on the positioning seat 95E and located between the positioning unit 953 and the working portion 96.

The working portion 96 is a hollow frame configured to receive the positioning plate 20, and has two pivot holes 961 corresponding to the two pivot portions 23 of the positioning plate 20.

The first embodiment of the present invention further comprises a cylinder 31, a bearing unit 32, and a holding ring 33. The cylinder 31 is first locked on a cylinder fixing board 312 by screws 311, and then connected to the working portion 96 by screws 313. The bearing unit 32 is disposed between the cylinder 31 and the positioning plate 20. The bearing unit 32 comprises a plurality of screws 321, a thimble 322, a plurality of bearings 323, a bearing fixing plate 324, and a bearing seat 325. The thimble 322 is located at the front end of the bearing seat 325. The cylinder 31 is to control engagement and disengagement of the front end of the thimble 322 and the other of the pivot portions 23 of the positioning plate 20, referring to FIG. 5A and FIG. 5B. The holding ring 33 is disposed in the pivot holes 961 of the working portion 96 to receive the bearing unit 32, and located between the bearing unit 32 and the positioning plate 20.

Figure 7:
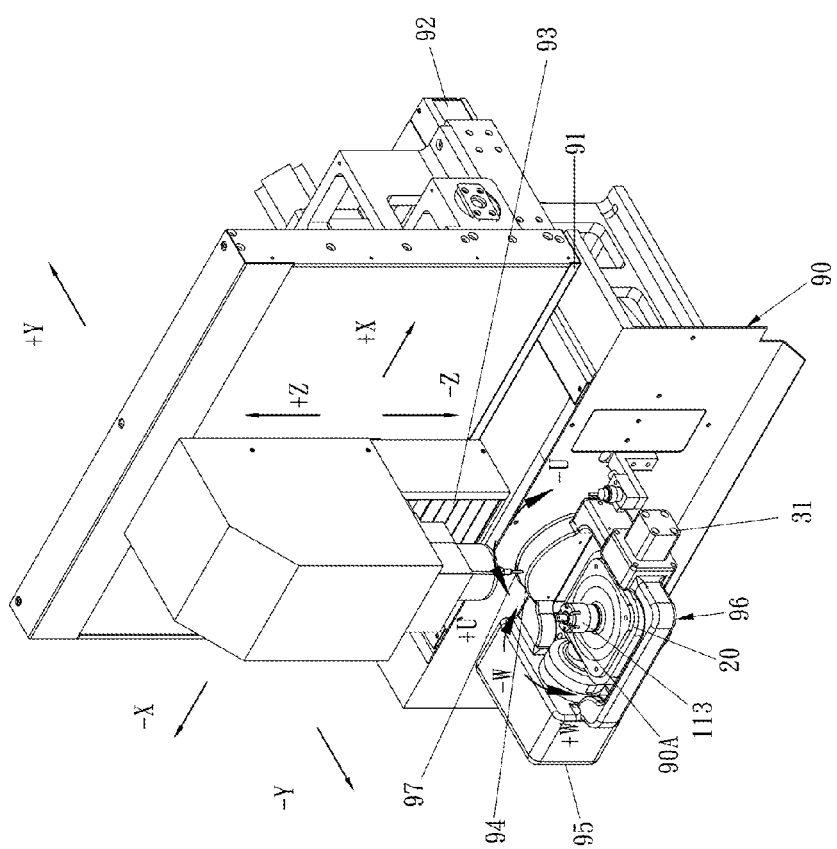
FIG. 7, FIG. 8 and FIG. 9 are schematic views showing that the present invention applied to the five-axis machine can be adjusted at different angles for processing.
Figure 8:
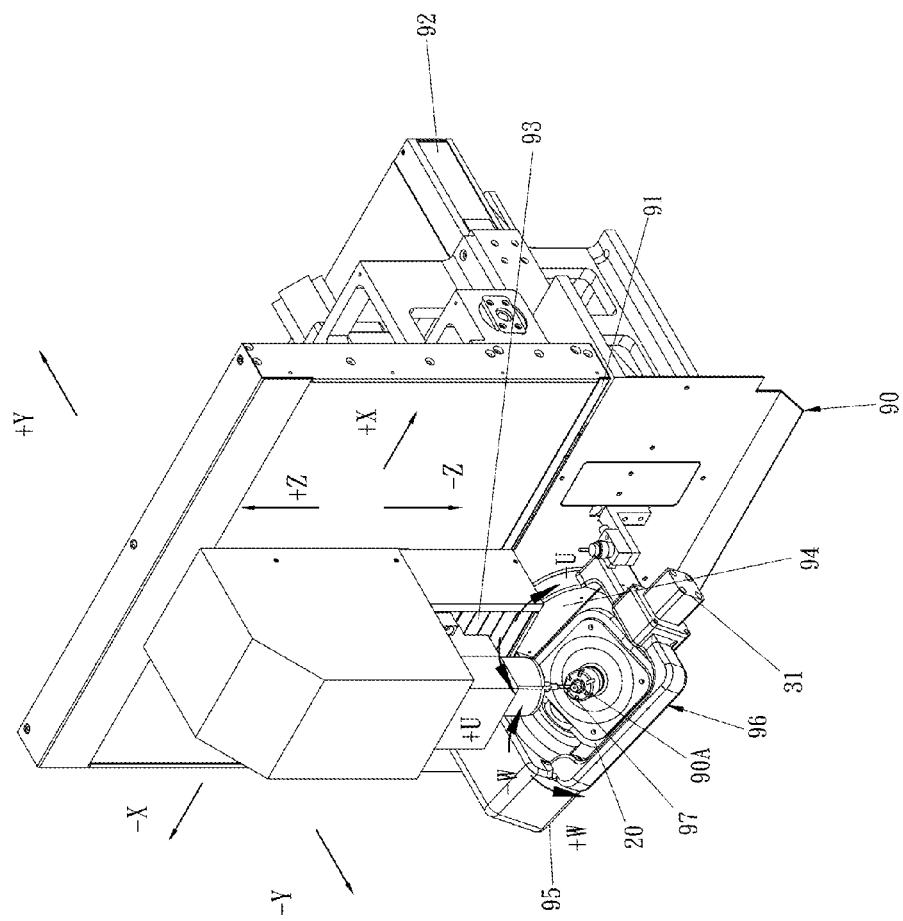
Figure 9:
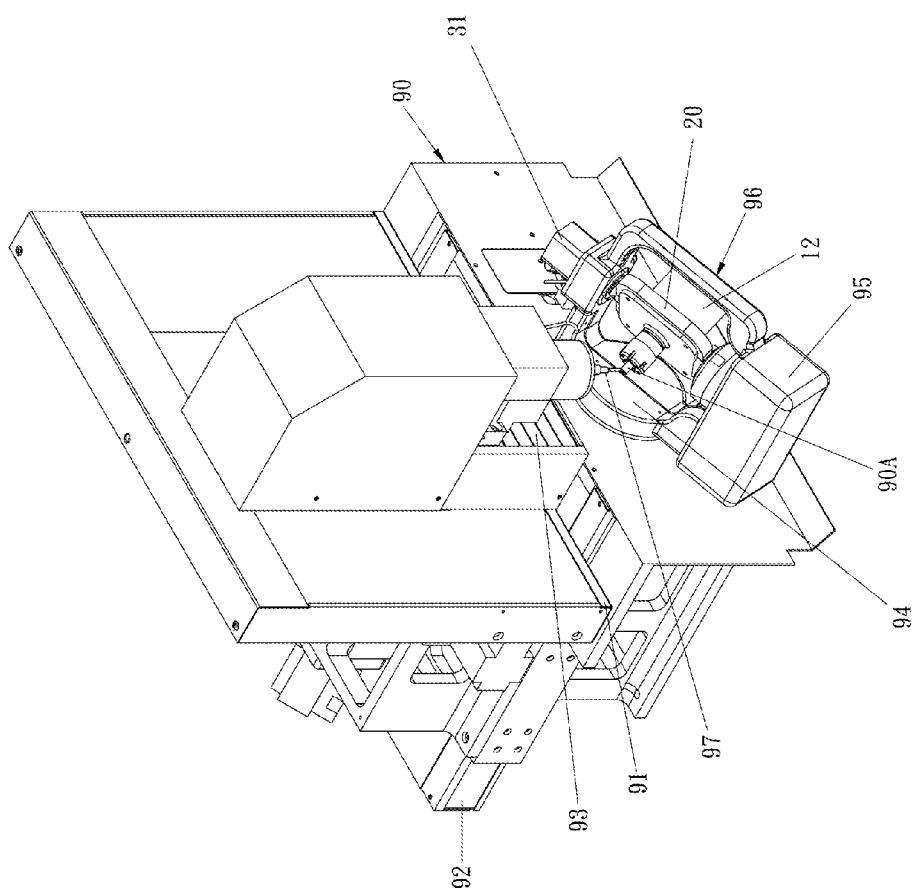
Figure 10:
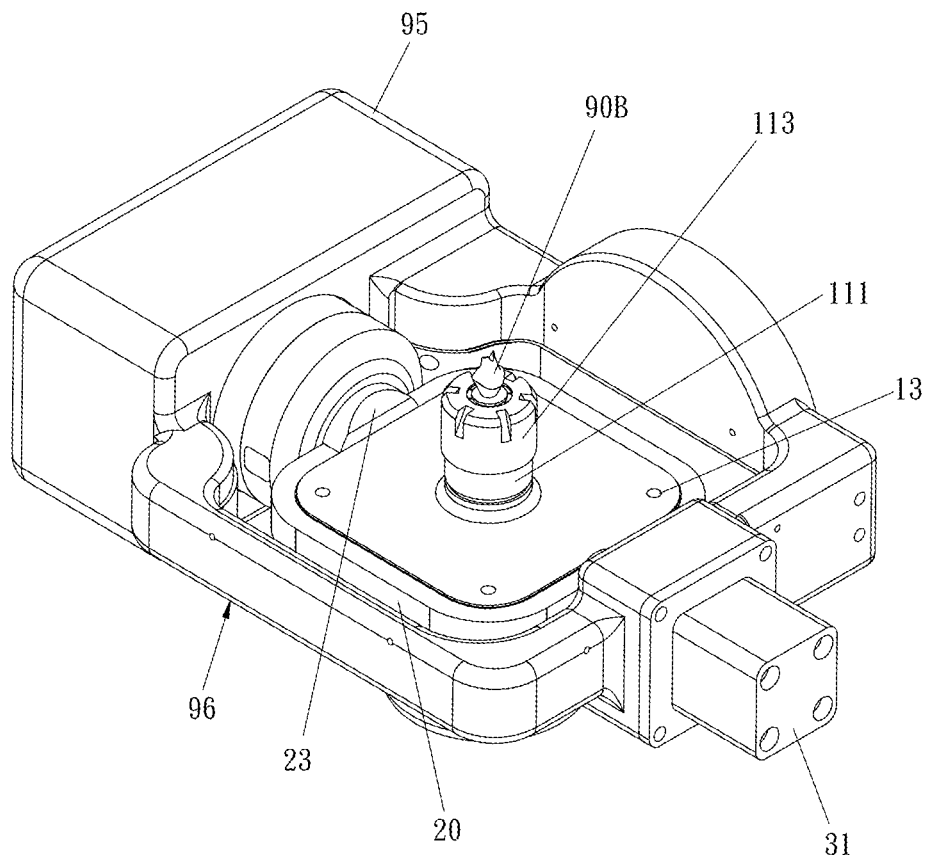
FIG. 10 is a schematic view showing the finished product processed by the present invention.
Figure 11:
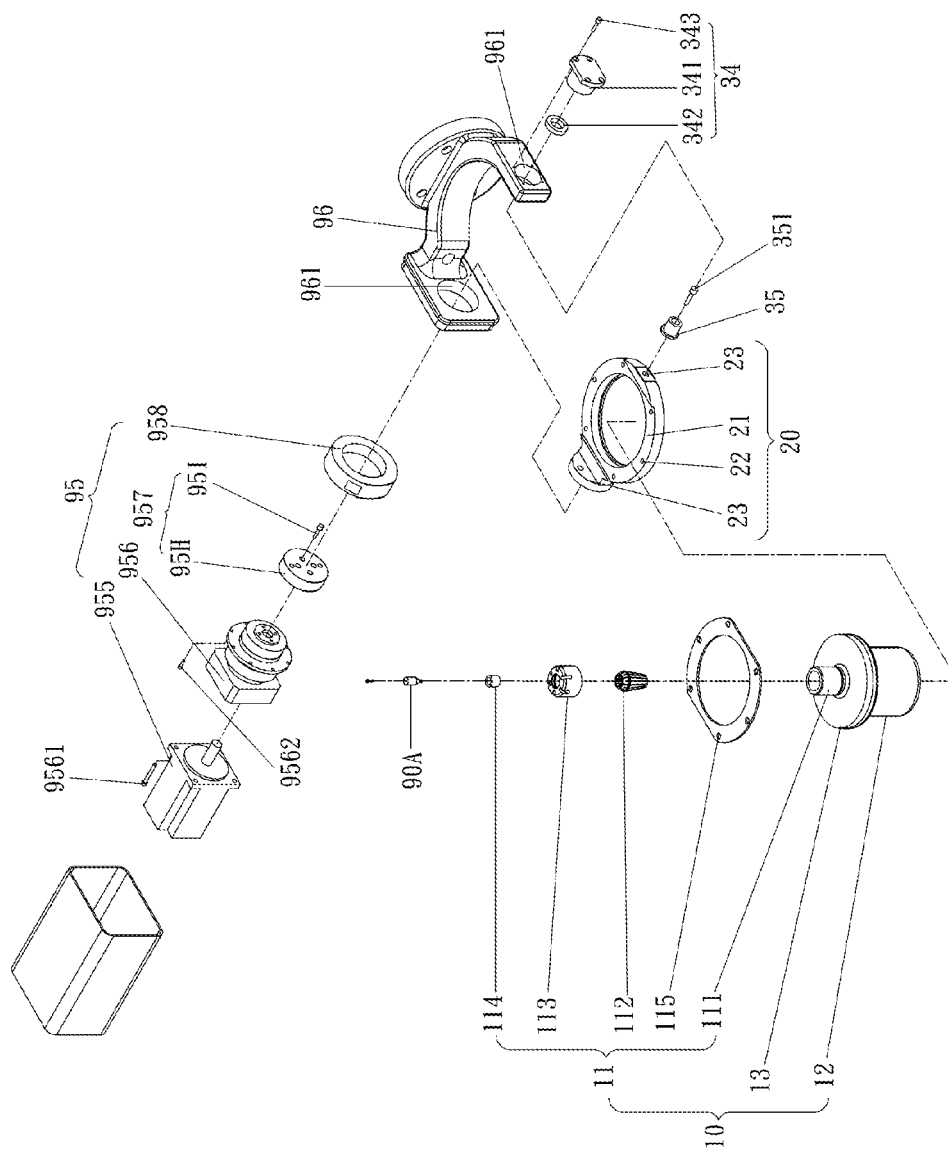
FIG. 11 is an exploded view according to a second embodiment of the present invention.
Figure 14:
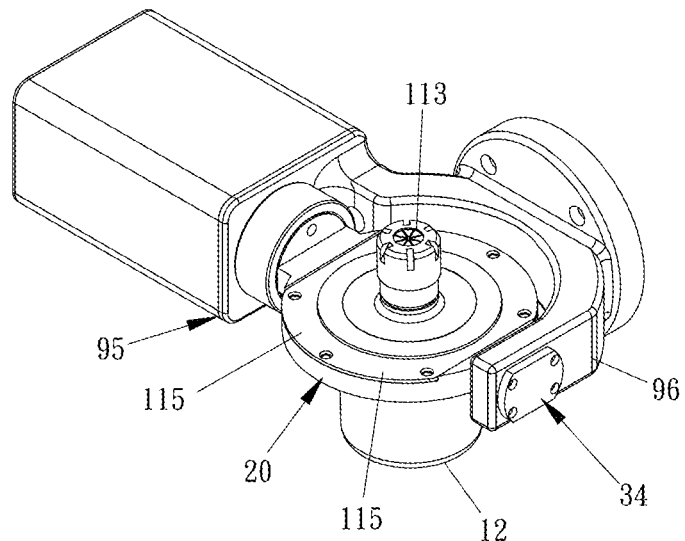
FIG. 14 is a schematic view of FIG. 11 at a first angle.
Figure 15:
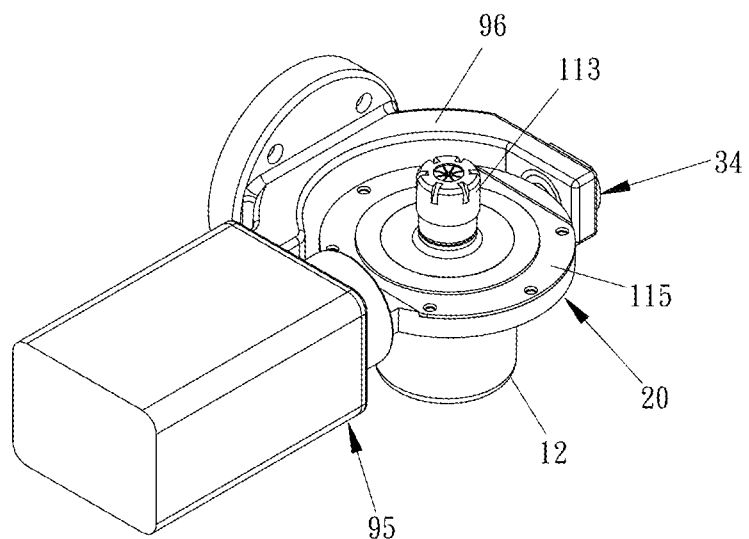
FIG. 15 is a schematic view of FIG. 11 at a second angle.
Figure 16:
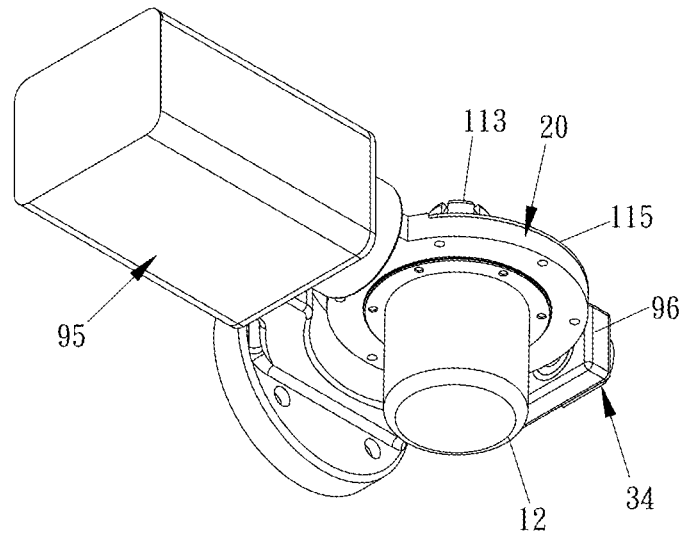
FIG. 16 is a schematic view of FIG. 11 at a third angle.
Figure 17:
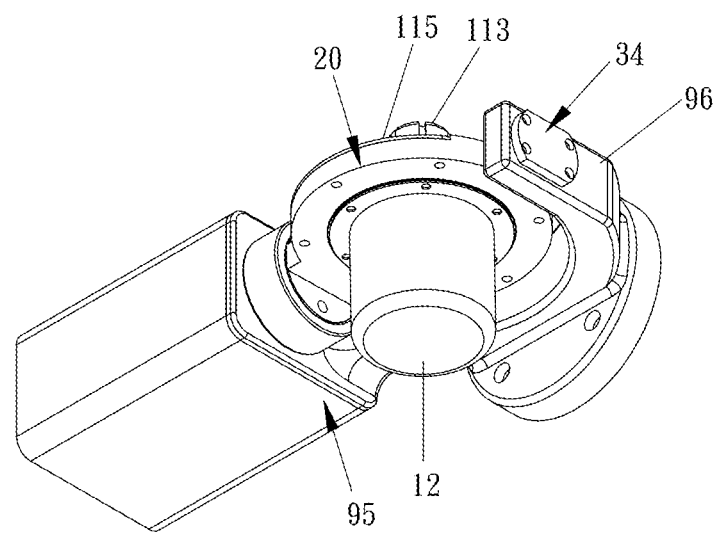
FIG. 17 is a schematic view of FIG. 11 at a fourth angle.

Referring to FIG. 7, FIG. 8, and FIG. 9, when in use, through the first-axis movement device 91 (the first movement direction X), the second-axis movement device 92 (the second movement direction Y), the third-axis movement device 93 (the third movement direction Z), the fourth-axis movement device 94 (the fourth movement direction U), and the fifth-axis movement device 95 (the fifth movement direction W), the present invention can carry out the five-axis movement for processing. In particular, the two pivot portions 23 of the positioning plate 20 are respectively connected with the front end of the positioning seat 95E of the positioning unit 953 of the fifth-axis movement device 95 and the front end of the thimble 322 of the bearing unit 32 controlled by the cylinder 31, referring to FIG. 5A. When the motor 951 of the fifth-axis movement device 95 is rotated, the positioning plate 20 and the ultrasonic device 10 are brought to turn accordingly, enabling the working end portion 11 and the processing portion 97 to carry out a relative five-axis movement by controlling the first-axis movement device 91, the second-axis movement device 92, the third-axis movement device 93, the fourth-axis movement device 94, and the fifth-axis movement device 95 of the five-axis machine 90 to cooperate with processing conditions so as to control the processing portion 97 to carry out operations for the working end portion 11 of the ultrasonic device 10 and to process the material 90A as a finished product 90B by cooperating with the ultrasonic vibrations, as shown in FIG. 10.

FIG. 11 to FIG. 17 shows a second embodiment (an immoveable type) of the present invention. The working end portion 11 further comprises a press plate 115 for pressing the vibration end portion 12 to be fixed to the positioning portion 21. The fifth-axis movement device 95 comprises a motor 955, a deceleration device 956, a positioning unit 957, and an induction ring 958. The deceleration device 956 is locked to the front end of the motor 951 by screws 9561 and locked to the working portion 96 by screws 9562. The deceleration device 956 is adapted to decelerate the power driven by the motor 955. The positioning unit 957 is disposed between the deceleration device 956 and the positioning plate 20. The positioning unit 957 comprises a positioning seat 95H and screws 95I. The positioning seat 95H is locked to the deceleration device 956 through the screws 95I. The positioning unit 957 and the deceleration device 956 can be rotated along with the motor 955. The front end of the positioning seat 95H is connected with one of the pivot portions 23 of the positioning plate 20. When the positioning unit 957 is rotated along with the motor 955, the positioning plate 20 and the ultrasonic device 10 are brought to turn accordingly. The induction ring 958 is located between the positioning unit 957 and the working portion 96.

The working portion 96 is a unilateral frame, and has two pivot holes 961 corresponding to the two pivot portions 23 of the positioning plate 20. The induction ring 958 is disposed on one of the pivot holes 961.

The second embodiment of the present invention further comprises a bearing unit 34 and a support post 35. The bearing unit 34 comprises a bearing seat 341, a bearing 342, and a plurality of screws 343. The bearing seat 341 is inserted in the other of the pivot holes 961 of the working portion 96. The bearing 342 is inserted in the bearing seat 341. The bearing seat 341 is locked to the outside of the other of the pivot holes 961 of the working portion 96 by the screws 343. The support post 35 is located in the pivot hole 961 of the working portion 96, and is coupled to the pivot portion 23 at one end of the positioning plate 20 by screws 351, and is inserted in the bearing 342 of the bearing unit 34 to be turned. The pivot portion 23 at the other end of the positioning plate 20 is connected with the front end of the positioning seat 95H of the positioning unit 957. When the positioning unit 957 is rotated along with the motor 955, the positioning plate 20 and the ultrasonic device 10 are brought to turn accordingly.

The advantages of the present invention are as follows:

(1) The working end portion can carry out a five-axis movement, which is beneficial for processing. Through an ingenious design of the present invention, the working end portion can bring the material to carry out the five-axis movement on the five-axis machine, such that the material can be processed at multiple angles and the finished product can have more variability.

(2) The present invention can be used widely. The present invention uses a five-axis movement and an ultrasonic processing to precisely process the material at multiple angels, such as artificial tooth, model, micro sculpture, and the like, so it can be used widely.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An ultrasonic positioning device for a five-axis machine, comprising an ultrasonic device and a positioning plate;
the ultrasonic device having a working end portion, a vibration end portion, and a first connecting portion, the working end portion being adapted to fix a material, the vibration end portion being connected to the working end portion and configured to generate ultrasonic vibrations for the material, the first connecting portion being connected between the working end portion and the vibration end portion and adapted for an external connection of the ultrasonic device;
the positioning plate comprising a positioning portion, a second connecting portion, and a pair of pivot portions, the positioning portion being adapted to accommodate and position the vibration end portion, the second connecting portion corresponding to the first connecting portion and being disposed on the positioning plate for the positioning plate to be connected with the ultrasonic device, the pair of pivot portions being adapted for the positioning plate to be pivotally connected to the five-axis machine so that the working end portion is brought to carry out a five-axis movement on the five-axis machine and to process the material by cooperating with the ultrasonic vibrations.

2. The ultrasonic positioning device for a five-axis machine as claimed in claim 1, wherein the working end portion comprises a base, a sleeve, a screw nut, and a material fixture, the base being connected to the first connecting portion, the sleeve being disposed in the base and changeable between a release position and a grip position, the screw nut being adapted to lock the base and able to release and clip the sleeve so that the sleeve is changeable between the release position and the grip position, the material fixture being disposed in the sleeve and adapted to fix the material, wherein when the sleeve is changed between the release position and the grip position, the material fixture is able to disengage from and engage with the sleeve, respectively.

3. The ultrasonic positioning device for a five-axis machine as claimed in claim 2, wherein the working end portion further comprises a press plate for pressing the vibration end portion to be fixed to the positioning portion.

4. The ultrasonic positioning device for a five-axis machine as claimed in claim 1, wherein the vibration end portion is an ultrasonic vibration configuration.

5. The ultrasonic positioning device for a five-axis machine as claimed in claim 1, wherein the five-axis machine comprises a first-axis movement device, a second-axis movement device, a third-axis movement device, a fourth-axis movement device, a fifth-axis movement device, a working portion, and a processing portion; the first-axis movement device being disposed on the five-axis machine and movable along a first movement direction; the second-axis movement device being disposed on the first-axis movement device and movable along a second movement direction; the processing portion being disposed on the third-axis movement device, the third-axis movement device being disposed on the second-axis movement device for bringing the processing portion to move along a third movement direction; the fifth-axis movement device being disposed on the fourth-axis movement device, the fourth-axis movement device being disposed on the five-axis machine for bringing the fifth-axis movement device to move along a fourth movement direction; the pair of pivot portions being adapted for the positioning plate to be pivotally connected to the fifth-axis movement device, the working portion being disposed on the fourth-axis movement device, the fifth-axis movement device being adapted to bring the positioning plate to move along a fifth movement direction, the first-axis movement device, the second-axis movement device, the third-axis movement device, the fourth-axis movement device, and the fifth-axis movement device of the five-axis machine being controlled to carry out a five-axis movement by cooperating with processing conditions so as to control the processing portion to carry out processing operations relative to the working end portion of the ultrasonic device and to process the material by cooperating with the ultrasonic vibrations.

6. The ultrasonic positioning device for a five-axis machine as claimed in claim 5, wherein the fifth-axis movement device comprises a motor, an elastic holding seat, a positioning unit, and an induction ring; the motor being locked to the working portion by screws for bringing the positioning plate to turn along the fifth movement direction; the elastic holding seat being disposed between the motor and the positioning plate, the elastic holding seat comprising a plurality of screws, a spring fixing seat, a spring, and a holding post; the positioning unit being disposed between the elastic holding seat and the positioning plate, the positioning unit comprising a positioning seat, a positioning post, and screws for locking the positioning seat to the motor, the positioning seat being locked to the elastic holding seat by the screws of the elastic holding seat, the holding post of the elastic holding seat being inserted through a center portion of the positioning seat, the positioning unit being rotated along with the motor; a front end of the positioning seat being connected to one of the pivot portions of the positioning plate to bring the positioning plate and the ultrasonic device to turn accordingly when the positioning unit is rotated along with the motor; the induction ring being fitted on the positioning seat and located between the positioning unit and the working portion; the working portion being a hollow frame configured to receive the positioning plate and having two pivot holes corresponding to the two pivot portions of the positioning plate.

7. The ultrasonic positioning device for a five-axis machine as claimed in claim 6, further comprising a cylinder, a bearing unit, and a holding ring; the cylinder being first locked on a cylinder fixing board by screws and then connected to the working portion by screws; the bearing unit being disposed between the cylinder and the positioning plate, the bearing unit comprising a plurality of screws, a thimble, a plurality of bearings, a bearing fixing plate, and a bearing seat, the thimble being located at a front end of the bearing seat, the cylinder being able to control engagement and disengagement of a front end of the thimble and the other of the pivot portions of the positioning plate; the holding ring being disposed in the pivot holes of the working portion to receive the bearing unit and located between the bearing unit and the positioning plate.

8. The ultrasonic positioning device for a five-axis machine as claimed in claim 5, wherein the fifth-axis movement device comprises a motor, a deceleration device, a positioning unit, and an induction ring; the deceleration device being locked to a front end of the motor by screws and locked to the working portion by screws, the deceleration device being adapted to decelerate power driven by the motor; the positioning unit being disposed between the deceleration device and the positioning plate, the positioning unit comprising a positioning seat and screws for locking the positioning seat to the deceleration device, the positioning unit and the deceleration device being rotated along with the motor, a front end of the positioning seat being connected with one of the pivot portions of the positioning plate, wherein when the positioning unit is rotated along with the motor, the positioning plate and the ultrasonic device are brought to turn accordingly; the induction ring being located between the positioning unit and the working portion; the working portion being a unilateral frame and having two pivot holes corresponding to the two pivot portions of the positioning plate, the induction ring being disposed on one of the pivot holes.

9. The ultrasonic positioning device for a five-axis machine as claimed in claim 8, further comprising a bearing unit and a support post; the bearing unit comprising a bearing seat, a bearing, and a plurality of screws, the bearing seat being inserted in the other of the pivot holes of the working portion, the bearing being inserted in the bearing seat, the bearing seat being locked to an outside of the other of the pivot holes of the working portion by the screws; the support post being located in the pivot hole of the working portion and coupled to the pivot portion at one end of the positioning plate by screws and inserted in the bearing of the bearing unit to be turned, the pivot portion at the other end of the positioning plate being connected with a front end of the positioning seat of the positioning unit, wherein when the positioning unit is rotated along with the motor, the positioning plate and the ultrasonic device are brought to turn accordingly.

* * * * *